(No Model.)
W. W. COMPTON.
COTTON GIN ATTACHMENT.
No. 244,190. Patented July 12, 1881.
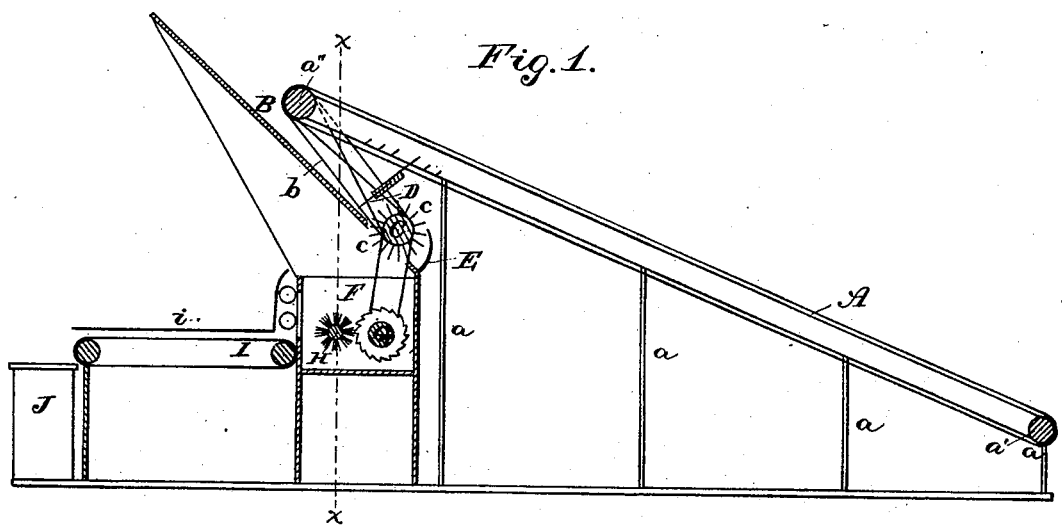
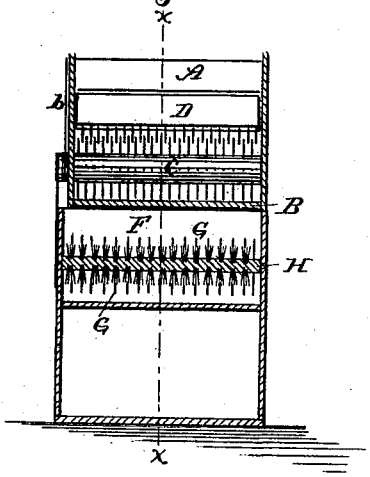
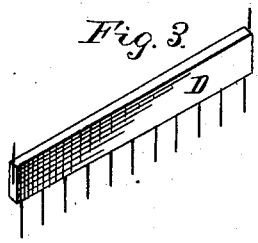
Witnesses:
J. W. Garner
H. S. D. James
Inventor:
Willis W. Compton
By H. J. Ennis
atty

UNITED STATES PATENT OFFICE.

WILLIS W. COMPTON, OF FAIRFIELD, TEXAS.

COTTON-GIN ATTACHMENT.

SPECIFICATION forming part of Letters Patent No. 244,190, dated July 12, 1881.

Application filed May 14, 1881. (No model.)

*To all whom it may concern:*

Be it known that I, WILLIS W. COMPTON, a citizen of the United States, residing at Fairfield, in the county of Freestone and State of Texas, have invented certain new and useful Improvements in Cotton-Gin Attachments; and I do hereby declare the following to be a full, clear, and exact description of the invention, such as will enable others skilled in the art to which it appertains to make and use the same, reference being had to the accompanying drawings, and to letters or figures of reference marked thereon, which form a part of this specification.

The object of my invention is to provide improved feed attachments for cotton-gins; and it consists in the construction and arrangement of parts, as hereinafter more fully described and claimed.

In the annexed drawings, in which like letters indicate like parts in the several views, Figure 1 is a longitudinal section. Fig. 2 is a cross-section on the line $x\,x$; and Fig. 3 is a detail.

A represents the main carrier, which is placed in an inclined position upon suitable supports or braces $a\,a$, and is arranged to convey the cotton to the receiver B. The carrier A is an endless belt running on the rollers $a'$ $a''$, that are operated in any suitable manner. From the roller $a''$ passes a belt, $b$, that revolves the feed-roller C, which is arranged in the receiver B, at the front of the apparatus, and is provided with a number of toothed projections, $c\,c$, that draw the cotton through the teeth of a sliding rake or regulator, D, that is adjustably attached within the receiver, in front of and above the roller C. The cotton is thus torn or separated into pellets, the dirt and seeds being partially removed, and is passed by the toothed roller C to the grate-fall or gin-breast E. The receiver B rests upon the top of the gin-stand F, within which are arranged the gin-saws G G and brushes H H, which operate in the usual manner. From the brush H the cotton passes to the carrier I, which is provided with a suitable cover, $i$, composed of some light material that will protect the cotton from dampness and prevent it from being blown about by currents of air. This carrier conveys the cotton to the press J.

By arranging the toothed roller or cylinder C and the sliding rake D at the front of the apparatus and above the gin-stand the cotton is cleaned and fed to the gin-saws with regularity and ease.

It will be observed that the main carrier A leads in an inclined position from the door of the gin-house, and is supported by braces at such a height that the attendant can readily pass beneath it without interfering with its operation.

The devices are simple and effective, and may be readily applied.

Having thus described my invention, what I claim as new, and desire to secure by Letters Patent, is—

1. The combination, in a cotton-gin, of the carrier A, feed-roller C, having teeth or projections $c\,c$, and the adjustable sliding rake D, substantially as specified.

2. The combination of the carriers A I, the latter having covering $i$, receiver B, toothed feed-roller C, adjustable rake D, gin-saws G, and brush H, substantially as shown and described.

In testimony whereof I hereby sign my name in the presence of two witnesses.

WILLIS W. COMPTON.

Witnesses:
 R. N. COMPTON,
 R. L. SMITH.